United States Patent Office 3,480,394
Patented Nov. 25, 1969

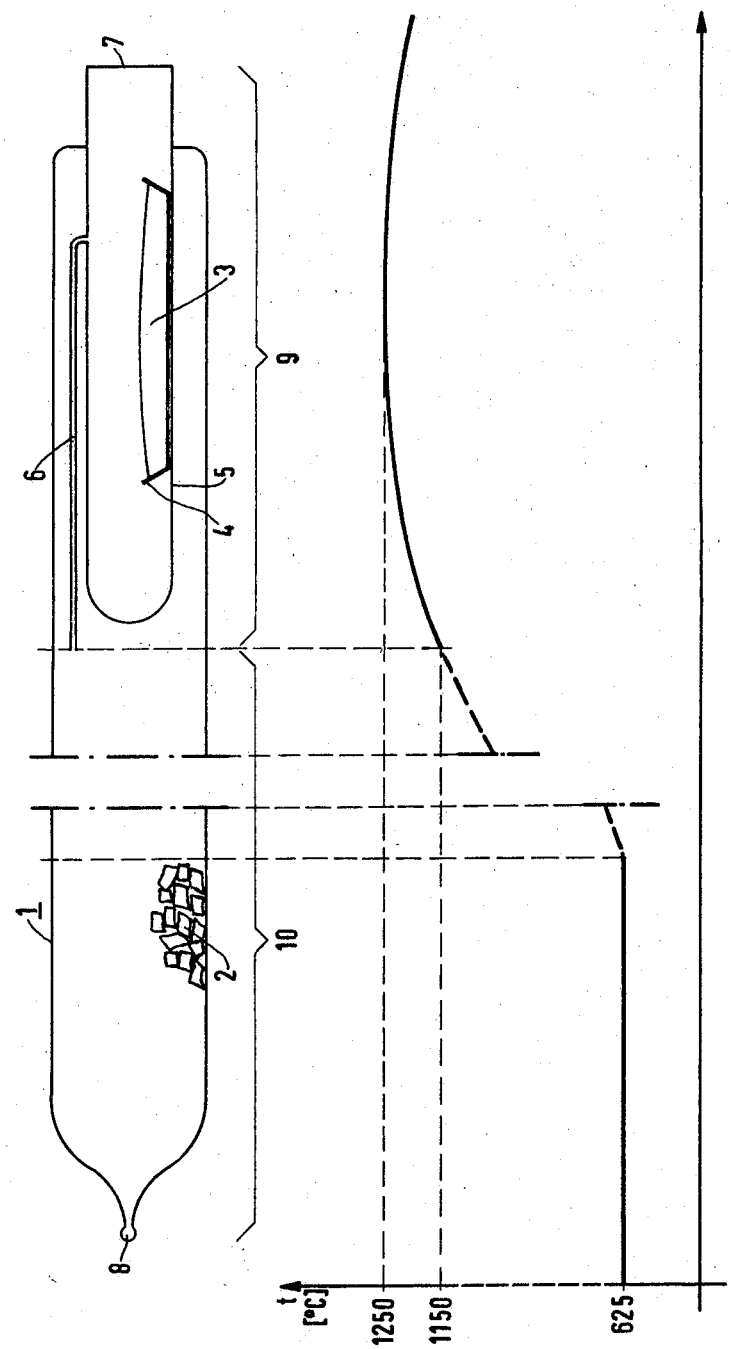

3,480,394
METHOD OF PRODUCING HIGHLY PURE, ESPECIALLY SILICON-FREE, GALLIUM ARSENIDE
Hans Merkel, Erlangen, and Siegfried Leibenzeder, Erlangen-Buchenbach, Germany, assignors to Siemens Aktiengesellschaft, Berlin, Germany, a corporation of Germany
Filed Sept. 27, 1967, Ser. No. 670,985
Claims priority, application Germany, Sept. 30, 1966, S 106,314
Int. Cl. C01g 15/00; C01b 27/00
U.S. Cl. 23—204                                                    4 Claims

ABSTRACT OF THE DISCLOSURE

The present invention relates to a method of producing highly pure, particularly silicon-free, gallium arsenide. The method is characterized by reacting the gallium metal to be used for synthesis with $10^{-1}$ to $10^{-4}$ percent by weight, particularly 0.003% by weight of highly pure silicon. This is subsequently reacted in a quartz vessel, i.e., in the high temperature part of the synthesis ampule which is separated from the low temperature arsenic-containing portion by a diffusion barrier. The reaction occurs above 1238° with arsenic vapor, while maintaining in the high temperature portion a temperature gradient of about 100° C., and removing the added silicon as well as other impurities.

---

It is known to produce GaAs from pure elements whereby arsenic vapor acts upon gallium heated to above 1238° C. In most cases, a quartz reaction vessel is used.

In the so-called "two-temperature method," gallium and arsenic are combined in a sealed quartz ampule which is heated to two different temperature ranges. The gallium in the high-temperature locality is heated to a temperature only slightly above the melting point of gallium arsenide while the arsenic in the low temperature locality is heated to a temperature at which arsenic has a vapor pressure of an atmosphere. This latter temperature is 620° C.

The degree of purity of gallium arsenide thus produced is inadequate for many usages, such as the production of laser diodes and luminescence diodes. At high reaction temperatures, silicon dioxide from the quartz vessel reacts with the gallium to form silicon which appears as a component of impurities found in gallium arsenide. Gallium arsenide obtainable on the market still contains approximately $10^{17}/cm.^3$ foreign atoms.

It is therefore the object of the present invention to present a method of producing highly pure, particularly silicon-free, gallium arsenide. Our method is characterized by reacting the gallium metal to be used for synthesis with $10^{-1}$ to $10^{-4}$ percent by weight, particularly 0.003% by weight of highly pure silicon. This is subsequently reacted in a quartz vessel, i.e., in the high temperature part of the synthesis ampule which is separated from the low temperature arsenic-containing portion by a diffusion barrier. The reaction occurs above 1238° with asenic vapor while maintaining in the high temperature portion a temperature gradient of about 100° C., and removing the added silicon, as well as other impurities.

It comes as a great surprise that the silicon which is added to the gallium does not produce, as one would expect, silicon-rich gallium arsenide, but rather gallium arsenide virtually free of silicon. Furthermore, our method reduces the amount of impurities still present in the gallium arsenide rods as compared to those produced according to known methods. Reduced for example, are zinc, magnesium, cadmium, calcium, carbon, etc.

The diffusion barrier is generally a long, narrow quartz tube which connects the gas chamber of the low temperature portion with that of the high temperature portion of the synthesis ampule. This tube is filled with arsenic vapor of 1 atm. pressure, which flows lively through the tube to the hot gallium in the high temperature portion, at which location the arsenic is consumed with formation of gallium arsenide. The flowing arsenide vapor prevents the diffusion of the gaseous reaction products (produced during synthesis in the hot portion) through the narrow tube, to the cooler part of the ampule.

If the gallium contains $10^{-1}$ to $10^{-4}$ percent by weight of silicon, the latter must react with the $SiO_2$ of the quartz boat to form gaseous SiO, in accordance with the equation:

$$Si + SiO_2 \rightleftharpoons 2\ SiO\ (gas)$$

until the SiO-gas equilibrium pressure, which corresponds thermodynamically to this reaction, is established.

It is reiterated that a temperature gradient of approximately 100° C. must be absolutely maintained in the high temperature portion of the synthesis ampule since only then do the processes take place which are essential for performing the method of the present invention wherein not only the silicon, which is added to the gallium, but also other impurities are removed to such a degree that the obtained gallium arsenide is of a purity heretofore unobtainable.

The invention will be further described with respect to the single figure:

In the figure, 1 is a quartz tube containing an excess pure arsenic 2 for reaction in order to establish the required vapor pressure. Gallium 3 reacted with highly pure silicon is located in a quartz boat 4 which is initially placed in a quartz tube sealed at its end. A quartz capillary 6, which is attached at the quartz tube 5 and whose diameter is approximately 1 mm., serves as a diffusion barrier. The numerals 7 and 8 are the sealing points which are applied following heating and evacuation. The numeral 9 is the high temperature portion and the numeral 10 the low temperature portion of the furnace.

In the above-described apparatus, 30 g. purified gallium, containing 1 mg. pure silicon were reacted with the required amount of arsenic vapor. The temperature at the high temperature portion was 1250° C. at the location of the gallium, and the temperature of the portion bordering the low temperature region was 1150° C. At the location of the arsenic, the low temperature part was maintained at approximately 625° C. The reaction time was approximately one hour.

The temperature prevailing over the entire synthesis ampule can be seen from the temperature profile which is also illustrated in the figure. Following the cooling, discs of approximately 0.5 mm. thickness were cut, from the essentially mono-crystalline GaAs rod, perpendicularly to its longitudinal axis. These discs were then further cut down so that the remaining semiconductor piece was monocrystalline. After alloying-in indium contacts, the following measure values were obtained for the gallium arsenide, at room temperature:

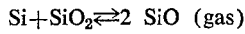

Conductance type _____ n.
Specific conductance _____ $10^{-4}$–$10^{-5}$ $^{-1}$.cm.$^{-1}$
Charge carrier concentration . $10^{10}$–$10^{12}$/cm.$^3$
Hall constant $R_H$ _____ –$10^6$–$10^7$ cm.$^3$/A.·sec.
Mobility _____ 9,000–10,000 cm.$^2$/v.·sec.

The gallium arsenide produced in accordance with our invention may be considered virtually spectral-pure. Also, the silicon which was added to the gallium disappeared, except for traces which could no longer be quantitatively ascertained.

Taking into account that the electric measuring values are characteristic for the degree of purity of gallium arsenide and that literature of the art lists values of, for example, 5,000 to 6,000 cm.²/volt·sec. for the mobility of the free charge carriers in gallium arsenide (see P. M. Hamilton, SCP and Solid State Technology, June 1964, p. 15), the gallium arsenide, produced according to the invention and having a mobility of free charge carriers of 9,000 to 10,000 cm.²/volt·sec., constitutes an extremely pure and, for some uses, very valuable material.

The method of the present invention is not to be limited to the illustration described in the above embodiment. It is characteristic for the new method that among other things, the transport of arsenic vapor to the hot gallium is effected by a long and narrow tube. The tube should be at least 5 cm. long and the inside diameter should not exceed 5 mm. The new method may also be so effected, for example, that the high temperature chamber and the low temperature chamber are separated by a quartz wall into which a narrow, thin-walled tube is inserted as a crushing valve which is opened by crushing or shattering only after heating up of the silicon-containing gallium, on the one hand, and the arsenic, on the other hand, and sealing of the apparatus.

The gallium arsenide with high electron mobility, produced in accordance with the present invention, is particularly suitable for semiconductor components, such as laser diodes, also as components in opto-electronic adjusters, as opto-electronic relays, for Gunn oscillators, microwave diodes and transistors.

We claim:
1. A method of producing highly pure, particularly silicon-free, gallium arsenide with a high electron mobility, fro mthe elements using a two-temperature furnace installation which comprises a quartz tube whose one end contains arsenic and into which a second, longer, sealed quartz tube containing the silicon-reacted gallium is introduced, which method comprises reacting the gallium metal used for synthesis with $10^{-1}$ to $10^{-4}$ percent by weight of highly pure silicon and subsequently reacting said silicon-containing gallium in the high-temperature portion of the synthesis tube which is separated from the low-temperature part by a diffusion barrier, above 1238° C. with a vaporous arsenic at above 1238° C., maintaining in the high-temperature portion a temperature gradient of approximately 100° C., thus removing the added silicon and other impurities.

2. The method of claim 1, wherein a temperature gradient between 1250° C. and 1150° C. is maintained in the high-temperature portion of the ampule.

3. The method of claim 2, wherein the diffusion barrier is a narrow tube with a diameter of 1–5 mm. and a length of 5 cm.

4. The method of claim 1, wherein about 0.003% by weight of silicon is reacted with the gallium.

References Cited

UNITED STATES PATENTS 3,305,313   2/1967   Sirgo et al. _____ 148—1.6

OSCAR R. VERTIZ, Primary Examiner

HOKE S. MILLER, Assistant Examiner

U.S. Cl. X.R.
23—273; 148—1.6